No. 696,875. Patented Apr. 1, 1902.
R. L. LEWIS.
BICYCLE TIRE.
(Application filed Oct. 19, 1901.)
(No Model.)
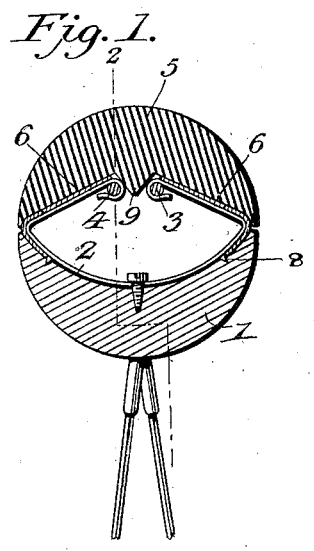
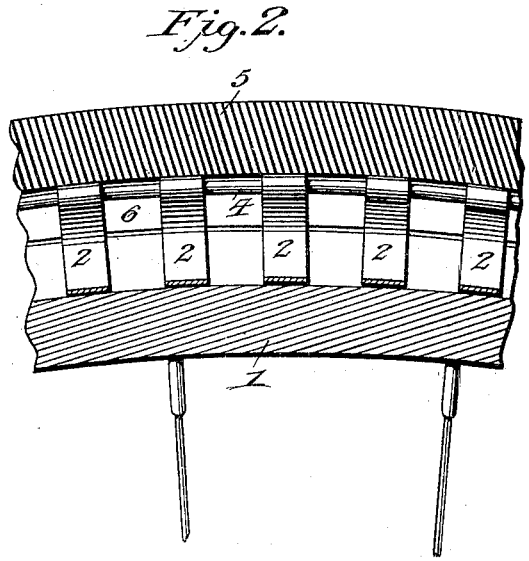
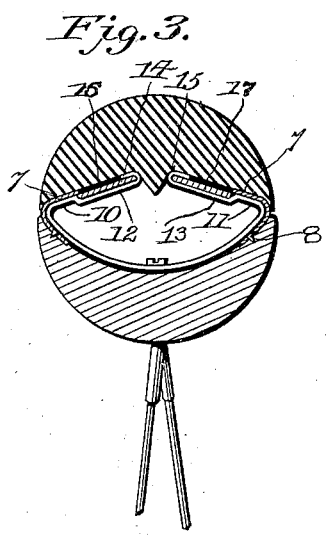
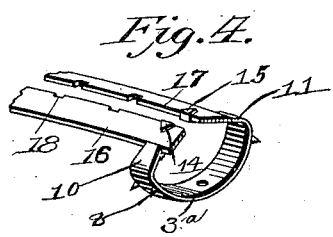
Witnesses
Edwin G. McKee
Geo. Ackman
Robert L. Lewis Inventor
By Victor J. Evans
Attorney.
THE NORRIS PETERS CO., PHOTO-LITHO., WASHINGTON, D. C.

United States Patent Office.

ROBERT LEE LEWIS, OF SAN FRANCISCO, CALIFORNIA.

BICYCLE-TIRE.

SPECIFICATION forming part of Letters Patent No. 696,875, dated April 1, 1902.

Application filed October 19, 1901. Serial No. 79,286. (No model.)

*To all whom it may concern:*

Be it known that I, ROBERT LEE LEWIS, a citizen of the United States, residing at San Francisco, in the county of San Francisco and State of California, have invented new and useful Improvements in Bicycle-Tires, of which the following is a specification.

This invention relates to bicycle-tires; and one of the objects thereof is to provide an improved tire which may be conveniently attached to the rim of an ordinary bicycle-wheel, and while preserving the resiliency of the pneumatic tire would not have the fault of collapsing when punctured.

With this object in view the invention consists in the novel arrangement of parts and the peculiar construction to be hereinafter described, and more fully defined in the appended claims.

In the drawings, Figure 1 represents a transverse sectional view of the rim of a bicycle-wheel to which my tire has been applied. Fig. 2 is a vertical longitudinal sectional view on the line 2 2 of Fig. 1. Fig. 3 is a cross-sectional view of a slightly-modified form, and Fig. 4 is a detail perspective view of the springs.

The reference-numeral 1 designates the rim of the wheel of the preferred construction, provided with the usual concave groove around its periphery. Arranged at determined intervals and properly spaced apart in the groove of the rim are a plurality of segmental curved springs 2, the upper ends of which are bent upon themselves and inclose circular rings or rods 3 and 4. Surrounding the springs is a concavo-convex tire 5, of rubber or other resilient material, the inner surface of which lies flush with the ends of the springs, and interposed between the tire and spring are strips of canvas or other fibrous material, (designated by the reference-numerals 6 and 7,) which are designed to overlap the edges of the springs adjacent the rim of the wheel and are secured to the springs by projecting spurs 8, which pass through the fabric and in through the wood of the rim.

It will be noticed that I provide a V-shaped rib 9 intermediate the longitudinal edges of the tire, which projects between the edges of the springs and which prevents the tire from accidental displacement from the springs and rings. The strips of canvas which are interposed between the tire and springs also assist in retaining the tire in its position on account of the friction which results.

In the modified form shown in Figs. 3 and 4 the construction of the tire is practically the same as in the preferred form. However, the spring comprises in this case a semicircular portion $3^a$, having upwardly and inwardly bent arms 10 and 11, provided with offsets 12 and 13 and rearwardly-bent ends 14 and 15, which inclose surrounding strips 16 and 17, notched at suitable intervals, as designated by the reference-numeral 18, to receive the bent ends of the springs, whereby an accidental displacement of the springs will be prevented. The strips are interposed between the tire and springs in substantially the same manner as in the construction shown in Figs. 1 and 2. Of course it will be obvious that the springs may be secured in the tire in any suitable manner; but I prefer to fasten them by screws. However, I reserve the right to change the minor details of construction and make other alterations which may suggest themselves from time to time without departing from the spirit of the invention.

It will thus be seen that I have provided an efficient and durable tire which will possess all of the advantages of the pneumatic tire, such as resiliency and fastness, without possessing the disadvantages of becoming useless in the event of a puncture.

What I claim, and desire to secure by Letters Patent, is—

1. In a bicycle-tire, the combination with the rim of a wheel, of a plurality of springs secured thereto and arranged in the form of segments, spurs on said springs adapted to engage the rim, and a resilient tread engaging the springs and provided on its under side with a depending portion which projects between the free ends of the springs.

2. In a bicycle-tire, the combination with the rim of a wheel, of circular rings arranged beneath the tread thereof, a plurality of springs spaced apart and having spurs arranged on their lower portions and having their upper portions secured to the said rings, and strips of fibrous material arranged on the free arms of the springs, and secured to the springs by the said spurs.

3. In a bicycle-tire, the combination with a plurality of springs adapted to be secured to the rim of the wheel and provided with a segmental curved portion and upwardly and inwardly bent arms terminating a short distance from each other, bands connecting the free ends of the arms of each spring to the arms of the remaining springs, strips of fibrous material secured to the arms of the respective springs, and a resilient tread carried by the arms of the springs and provided with a central rib which is interposed between said arms.

In testimony whereof I affix my signature in presence of two witnesses.

ROBERT LEE LEWIS.

Witnesses:
MALCOLM McKENZIE,
H. H. JOHNSTON.